US007104582B2

(12) United States Patent  
Morrison

(10) Patent No.: US 7,104,582 B2
(45) Date of Patent: *Sep. 12, 2006

(54) COLLAPSIBLE CARGO ORGANIZER

(76) Inventor: Robert P. Morrison, 20080 Myron Dr., Livonia, MI (US) 48152-1267

(*) Notice: Subject to any disclaimer, the term of this patent is extended or adjusted under 35 U.S.C. 154(b) by 0 days.

This patent is subject to a terminal disclaimer.

(21) Appl. No.: 11/289,019

(22) Filed: Nov. 29, 2005

(65) Prior Publication Data

US 2006/0103158 A1 May 18, 2006

Related U.S. Application Data

(62) Division of application No. 10/766,047, filed on Jan. 28, 2004, now Pat. No. 6,979,037.

(51) Int. Cl.
B60R 13/01 (2006.01)

(52) U.S. Cl. .................. 296/37.5; 296/37.6; 296/3; 296/39.2

(58) Field of Classification Search ............. 296/37.1, 296/37.5, 37.6, 3, 10, 26.02, 26.05, 26.06, 296/39.1, 39.2; 224/42.34, 282, 484, 533; 410/121, 129, 140, 145, 148
See application file for complete search history.

(56) References Cited

U.S. PATENT DOCUMENTS

| 3,376,994 | A | | 4/1968 | Flinn, Jr. |
| 3,460,864 | A | * | 8/1969 | Piercy ............................ 296/3 |
| 4,029,244 | A | | 6/1977 | Roberts |
| 4,189,056 | A | | 2/1980 | Majewski |
| 4,372,512 | A | | 2/1983 | Wolfe |
| 4,540,213 | A | | 9/1985 | Herlitz et al. |
| 4,684,087 | A | | 8/1987 | Spickard |
| 4,982,866 | A | | 1/1991 | Krawagna |
| 5,009,457 | A | | 4/1991 | Hall |
| 5,037,152 | A | * | 8/1991 | Hendricks .................... 296/3 |
| 5,379,906 | A | | 1/1995 | Levin et al. |
| 5,431,472 | A | * | 7/1995 | Coffland ........................ 296/3 |
| 5,439,152 | A | * | 8/1995 | Campbell ................... 224/405 |
| 5,515,987 | A | | 5/1996 | Jacques et al. |
| 5,662,254 | A | * | 9/1997 | Lemajeur et al. ........... 224/405 |
| 6,056,177 | A | | 5/2000 | Schneider |
| 6,135,332 | A | | 10/2000 | Eleam |
| 6,149,040 | A | | 11/2000 | Walker |
| 6,227,593 | B1 | | 5/2001 | De Valcourt |
| 6,253,943 | B1 | | 7/2001 | Spykerman et al. |
| 6,375,055 | B1 | | 4/2002 | Spykerman et al. |
| 6,422,407 | B1 | | 7/2002 | Arai |

(Continued)

Primary Examiner—D. Glenn Dayoan
Assistant Examiner—Greg Blankenship
(74) Attorney, Agent, or Firm—William J. Schramm

(57) ABSTRACT

Described is a cargo apparatus (10) including a base (16) having at least one end (30) and at least one side (28), with the at least one end having at least one laterally inside post (20) extending therefrom, and with the at least one side having at least one laterally outside post (18) extending therefrom. At least one end bracket (24) and at least one side bracket (22) are pivotably and translatably mounted to the base, wherein the brackets each have at least one support leg (38, 44) with a mounting end (42, 48). The mounting end pivotably mounts to its respective post on the base between open and closed positions and also translatably mounts to its respective post between an unlocked position distal the post and a locked position proximal the post, whereby the apparatus is collapsible to a closed portable position, and is foldable to a sturdy, open position.

20 Claims, 5 Drawing Sheets

U.S. PATENT DOCUMENTS

| | | |
|---|---|---|
| 6,422,627 B1 | 7/2002 | Kuhn et al. |
| 6,520,364 B1 | 2/2003 | Spykerman et al. |
| 6,598,922 B1 * | 7/2003 | Morse et al. ............ 296/26.02 |
| 6,623,059 B1 | 9/2003 | Gehring et al. |
| 6,644,704 B1 | 11/2003 | Nyberg |
| 6,811,198 B1 | 11/2004 | Caro et al. |
| 2002/0145022 A1 | 10/2002 | Nguyen et al. |

* cited by examiner

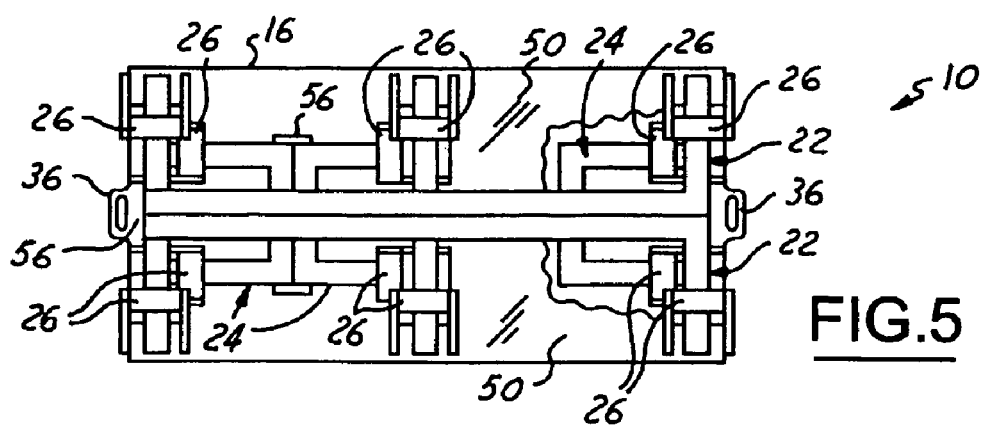
FIG.5
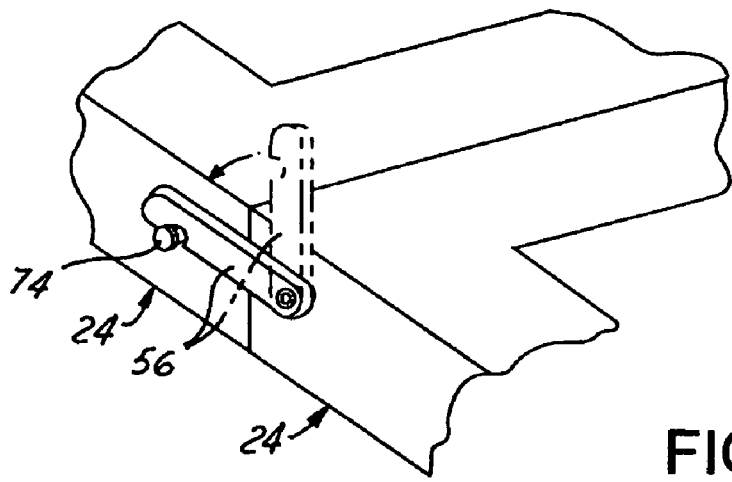
FIG.6
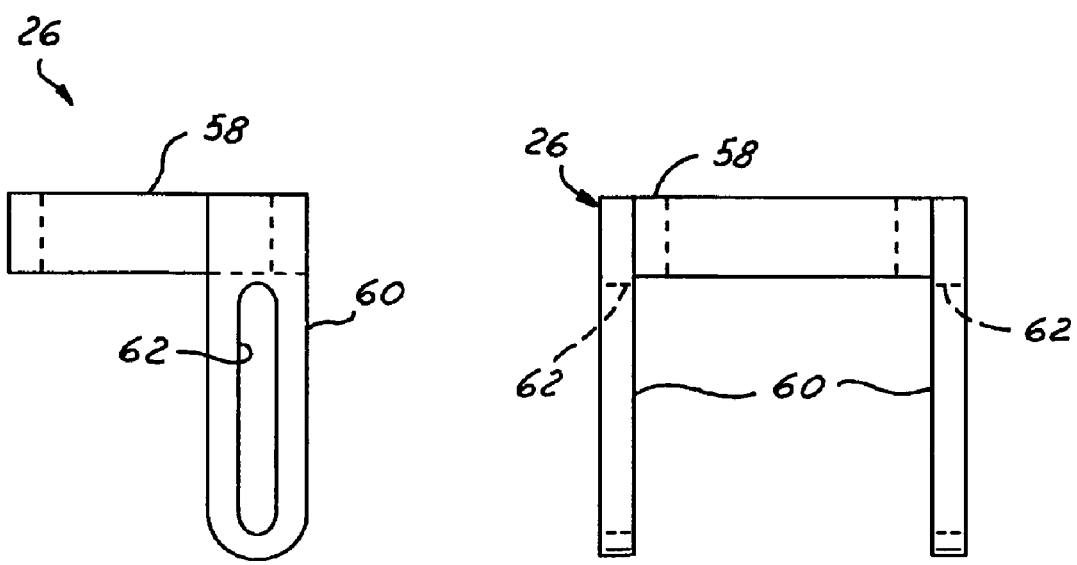
FIG.7
FIG.8

COLLAPSIBLE CARGO ORGANIZER

CROSS-REFERENCE TO RELATED APPLICATION

This application is a divisional patent application of, and claims priority to, prior application Ser. No. 10/766,047, filed Jan. 28, 2004 now U.S. Pat. No. 6,979,037, entitled COLLAPSIBLE CARGO ORGANIZER, by the inventor hereof.

FIELD OF THE INVENTION

The present invention pertains to receptacles having foldable sections. In particular the invention pertains to a collapsible cargo container for a cargo compartment of a transportation apparatus such as for a trunk of a car or a bed of a pick-up truck.

BACKGROUND OF THE INVENTION

Transportation vehicles such as cars, vans, trucks, watercraft, aircraft, and the like are typically provided with cargo compartments of some kind. For example, cars have trunks, vans and wagons have storage areas behind rear seats, and pick-up trucks have beds. Such cargo compartments are often used to carry and transport cargo items that may shift during transport if not restrained in some manner. Various methods and devices for restraining and organizing cargo items within such cargo areas have been proposed. Unfortunately, however, such methods and devices involve unnecessarily intricate designs, flimsy construction, and complicated operation.

There is a need for an improved apparatus for containing, restraining, and organizing cargo items within a transportation vehicle.

There is a need to provide such an apparatus that is collapsible from an open position to a closed position, removable from a cargo area, and portable between cargo areas or storage.

There is a need for such an apparatus that is of relatively inexpensive design and robust construction from commercially available components, and that is easy to use.

It is an object of the present invention to provide an improved apparatus for containing, restraining, and organizing cargo items that has end brackets and side brackets that are collapsible from an open position to a closed position, such that the apparatus is removable from a cargo area and portable between cargo areas or storage.

SUMMARY OF THE INVENTION

Described is a cargo apparatus including a base having at least one end and at least one side, wherein the at least one end has at least one laterally inside post extending therefrom, and the at least one side has at least one laterally outside post extending therefrom. The at least one laterally outside post is positioned laterally outside with respect to the at least one laterally inside post. The apparatus also includes at least one end retaining bracket pivotably and translatably mounted to the at least one laterally inside post between open and closed positions, and at least one side retaining bracket pivotably and translatably mounted to the at least one laterally outside post between open and closed positions.

This invention also pertains to a cargo apparatus including a base, and a first plurality of structural members pivotably and translatably mounted to the base and being adapted to fold to a first level closed position. The apparatus also includes a second plurality of structural members pivotably and translatably mounted to the base laterally outside of the first plurality of structural members. The second plurality of structural members is adapted to fold to a second level closed position over top of the first plurality of structural members.

BRIEF DESCRIPTION OF THE DRAWINGS

These and other objects, features and advantages of this invention will be apparent from the following detailed description, appended claims and accompanied drawings in which;

FIG. 5 is a perspective view of a portion of the assembled closed apparatus of the invention;

FIG. 6 is a perspective view of a portion of the assembled and closed apparatus of FIG. 5, wherein side brackets are latched together;

FIG. 7 is a side view of a mounting bracket of the apparatus of FIG. 1;

FIG. 8 is a front view of the mounting bracket of the apparatus of FIG. 7;

DETAILED DESCRIPTION OF THE INVENTION

Definitions

Cargo is defined as any goods or other items for transport.

Container is a receptacle, such as a box or jar, for holding goods or other items.

Base is defined as a foundational structural element for supporting other elements.

Post means a piece of material fixed in an upright position; especially as a stay or support.

Bracket means a structural member that serves, at least partially, as a wall of a container.

Pivot, pivotable, pivotably, and the like mean the angular or rotational movement of a thing independent of any translational movement of the thing.

Translate, translatable, translatably, and the like mean the straight or linear movement of a thing independent of any rotational movement of the thing.

Distal is a spatially relative term meaning located away from the point of attachment or origin of a body; especially of the body. Compare antonym proximal.

Proximal is a spatially relative term meaning located next to or nearer the point of attachment or origin of a body; especially located toward the center of the body. Compare antonym distal.

Mesial is a spatially relative term meaning located between a distal or proximal location; especially located equidistantly from both the distal and proximal locations.

Lateral means of or relating to the side; situated on, directed toward, or coming from the side; or extending from side to side, e.g. lateral axis of an airplane.

Longitudinal means placed or running lengthwise; or relating to length or the lengthwise dimension.

Turning now to the drawings in the case.

Figure 1:
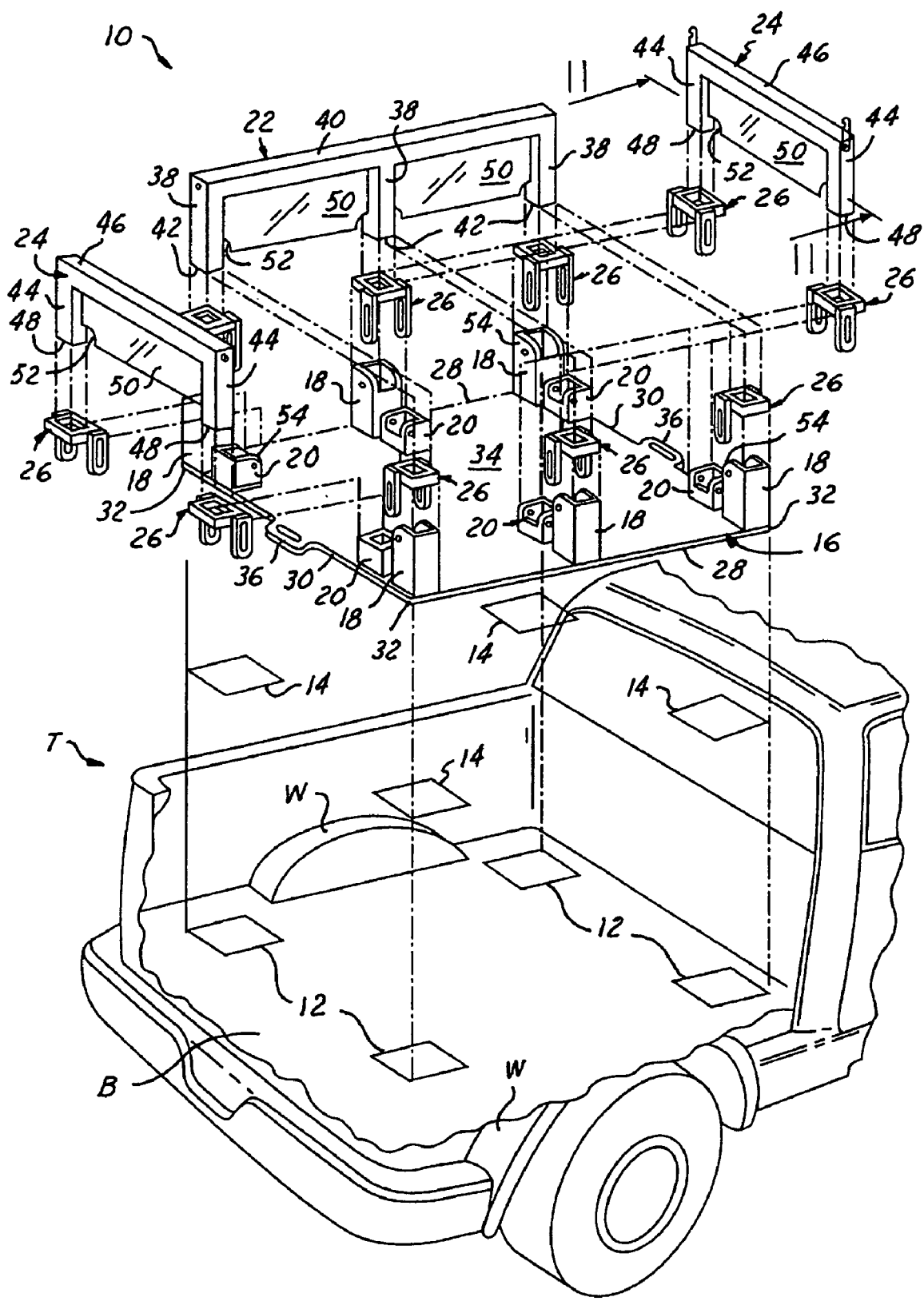
FIG. 1 is an exploded perspective view of an apparatus according to an embodiment of the present invention that is shown in combination with a bed of a pick-up truck.

FIG. 1 illustrates an exploded perspective view of a cargo apparatus 10 according to an embodiment of the present invention that is shown, for exemplary purposes only, in combination with a bedliner B of a pick-up truck T. It is contemplated, however, that the apparatus 10 could be used with any type of transportation apparatus such as a car, van, boat, airplane, or the like. The cargo apparatus 10 may be attached to the bedliner B by any desired fastening means of any kind, such as nuts and bolts, Velcro® hook and loop patches 12, 14 as shown, or the like. It is contemplated, however, that the apparatus 10 could be freely located within the bedliner B of the pick-up truck T between wheel wells W. It is also contemplated that the base 16, and perhaps other components of the apparatus 10, could be integrated with the bedliner B. In any case, the cargo apparatus 10 includes a base 16 for supporting a plurality of outside and inside posts 18, 20 thereof that pivotably and translatably cooperate with side E-shaped retaining brackets 22 and end C-shaped retaining brackets 24 by way of a plurality of mounting brackets 26. The various components of the apparatus 10 are preferably composed of galvanized steel for corrosion resistance, but may be composed of any other types of materials such as plastic or bare steel.

The base 16 provides a means for supporting, locating, and handling the rest of the apparatus 10. The base 16 is preferably rectangular in shape, including opposed sides 28, 28', opposed ends 30, 30', corners 32 defined by the sides 28, 28' and ends 30, 30', and a top surface 34. The base 16 longitudinally extends from one end 30 to the other, and laterally extends from one side 28 to the other. The base 16 is provided with a thickness that is preferably adequate enough to provide rigid support for handling the apparatus 10 in an unloaded condition. For example, the base 16 could be composed of about ¼" thick galvanized steel plate. For ease of handling and positioning the apparatus 10, integral handles 36 are provided at the ends 30. The handles 36 are necessary because without such handled 36 one could not grasp and manipulate the entire apparatus 10 by the various individual brackets 22, 24, because such brackets 22, 24 would become unseated and collapse.

The posts 18, 20 of the base 16 are preferably integrally attached to the top surface 34 of the base 16, such as by welding or the like. If the apparatus 10 is composed of a plastic material, then the posts 18, 20 may be injection molded to integrally extend from the top surface 34 of the base 16. In any case, the plurality of outside posts 18 includes an outside post 18 at each corner 32 of the base 16 and an outside post 18 centered longitudinally along each side 28 of the base 16, as shown. Accordingly, a first set of outside posts 18 is defined along one side 28 of the base 16 and an opposed, second set of outside posts 18 are defined along the other side 28' of the base 16. Similarly, the plurality of inside posts 20 include posts 20 positioned just laterally inside of respective opposed outside posts 18 of the opposed first and second sets of outside posts 18. Accordingly, two pairs of inside posts 20 are positioned at the ends 30, 30' of the base 16 and one pair is positioned at a center location midway along the length of the base 16 and just inside the respective center outside posts 18, as shown. The outside posts 18 are preferably taller than the inside posts 20 by an amount that is about equal to the width of the legs 38, 44 of the brackets 22, 24, thereby facilitating compact, multi-level collapsibility of the apparatus 10, as will be further discussed below.

The opposed side E-shaped brackets 22 (only one bracket is shown for clarity) include laterally spaced support legs 38 that are connected by a common retaining bar 40 integrally extending across the tops of the legs 38. Opposite of the retaining bar 40, the legs 38 terminate in mounting ends 42 that are assembled through the mounting brackets 26, which function to pivotably and translatably mount the legs 38 of the E-shaped retaining brackets 22 to their respective posts 18, as will be described in further detail below.

The plurality of C-shaped brackets 24 includes first, second, and third C-shaped brackets 24. (The second or divider bracket is omitted for clarity). Each bracket 24 includes support legs 44 that are connected by a common retaining bar 46 integrally extending across the tops of the legs 44. Opposite of the retaining bar 46, the legs 44 terminate in mounting ends 48 that are assembled through the mounting brackets 26, which pivotably and translatably mount the legs 44 of the retaining brackets 24 to their respective posts 20, as will be described in further detail below.

Still referring to FIG. 1, each of the C-shaped and E-shaped brackets preferably includes one or more panels 50 mounted in the spaces or apertures defined between the legs 38, 44 of the brackets 22, 24. The panels 50 are preferably composed of a rigid material, such as Plexiglas®, or the like. Each panel 50 includes cutouts 52 therein to accommodate clearance for the mounting brackets 26. It is also contemplated that a flexible material could be substituted for the rigid panel material such as canvas, vinyl, netting, or the like. In any case, the function of the panels 50 is to provide a retaining or restraining means for cargo items placed within the confines of the apparatus 10. The panels 50 may be fastened, glued, or otherwise attached to the retaining brackets 22, 24 in any desired manner.

The retaining brackets 22, 24 all pivot from a closed position, as shown in FIG. 5, to an open position, as shown here in FIG. 1, to define an open container. Each of the posts 18, 20 preferably includes a rounded portion 54 for facilitating pivoting of respective legs 38, 44 of respective retaining brackets 22, 24 thereover. The divider bracket (not separately shown here for clarity) opens to divide the open container into two smaller containers. Accordingly, the apparatus 10 can be used to organize and retain cargo items therein. It is contemplated that any number of divider brackets 24 could be used to divide the peripheral boundaries of the apparatus 10 into two or more sub-containers.

Figure 11:
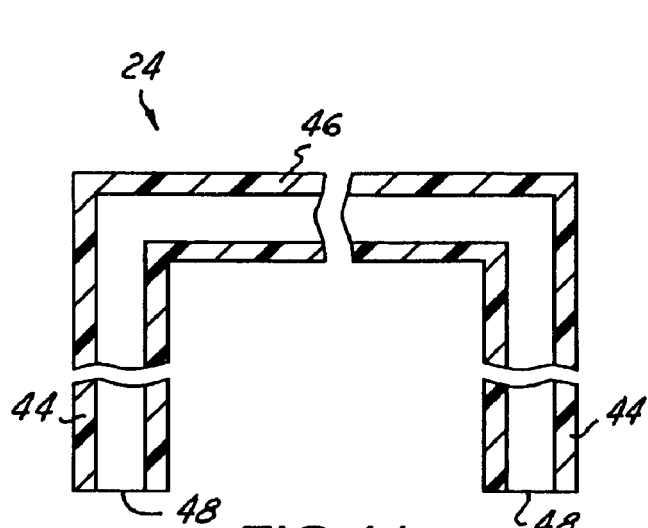
FIG. 11 is a cross-sectional view of a bracket of the apparatus of FIG. 1, taken along line 11—11.
Figure 12:
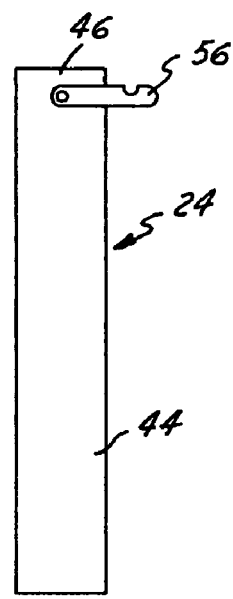
FIG. 12 is a side view of the bracket of the apparatus of FIG. 11.

As depicted by FIG. 11, each of the C-shaped retaining brackets 24 is preferably formed from commercially available structural tube-stock, and the same applies to the E-shaped brackets (not shown here). Alternatively, the retaining brackets 24 could be solid or hollow components that are injection molded from plastic. Also, as depicted in FIG. 12, some of the brackets 24 preferably include latches 56 pivotably mounted to the ends or retaining bars 46 thereof, as will be discussed further below.

As shown in FIGS. 7 and 8, each mounting bracket 26 includes a collar portion 58 that circumscribes the outside of the leg of its respective retaining bracket (not shown here). Fastening flanges 60 of the mounting bracket 26 extend axially from one side of the collar portion 58 and include slots 62 therethrough that facilitate pivoting and translating of the respective retaining bracket with respect to its respective post (not shown here). The mounting brackets 26 are preferably stamped from metal such as galvanized steel plate, but may also be injection molded from plastic, cast or machined from any metal, or the like. The collars 58 of the mounting brackets 26 are preferably fixed to their respective retaining brackets (not shown here) such as by welding, bolting, or the like. Where the mounting brackets 26 and retaining brackets are produced by injection molding, the two components could be integrally molded together. Moreover, it is contemplated that the function of the mounting brackets 26 could be substituted for integral features formed into the posts and retaining brackets (not shown), such as slots in the retaining brackets that cooperate with a pin extending through such slots and through opposed walls of the respective posts (not shown here).

Figure 2:
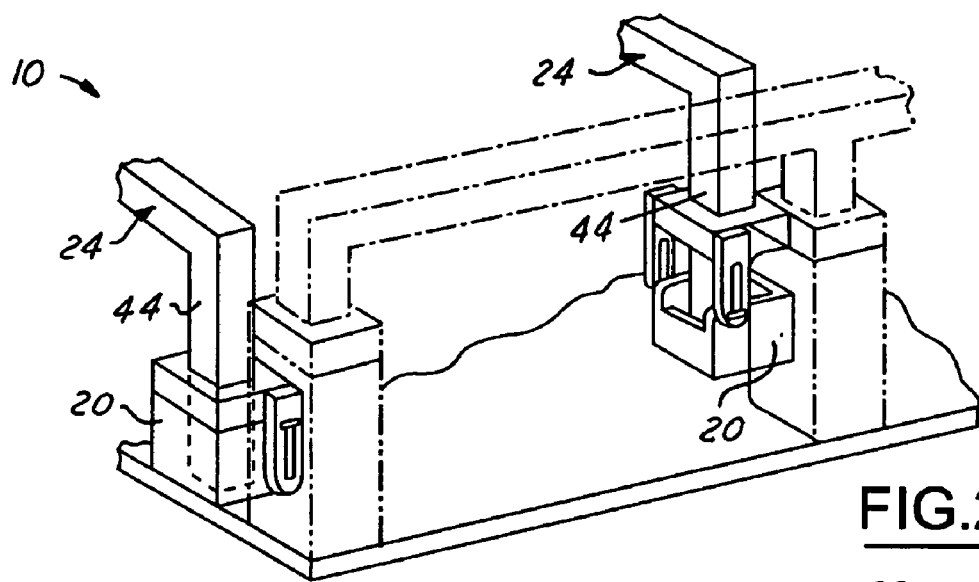
FIG. 2 is a perspective view of a portion of the assembled apparatus of FIG. 1.
Figure 3:
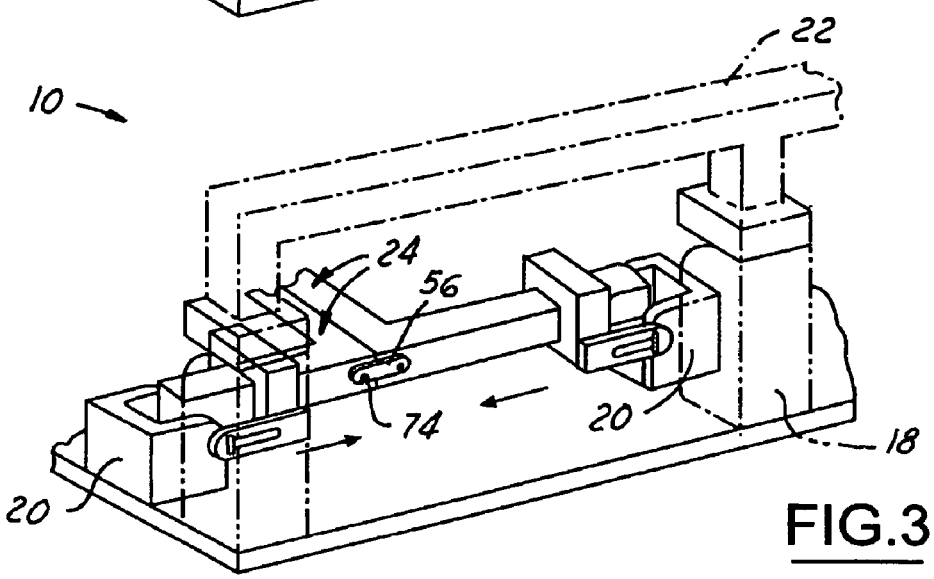
FIG. 3 is a perspective view of a portion of the assembled apparatus of FIG. 2, wherein an end bracket and divider bracket are folded to a closed position.
Figure 4:
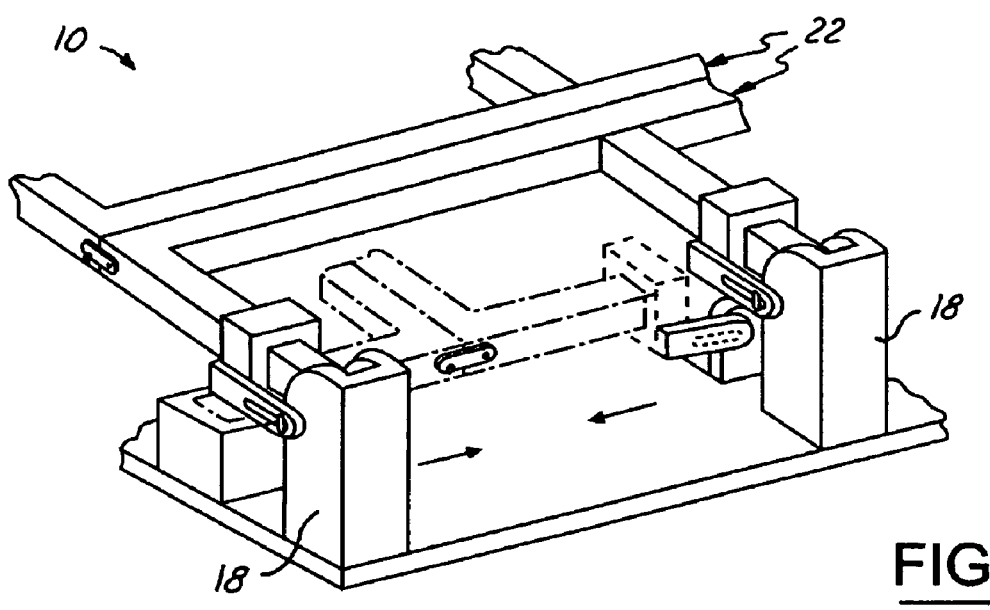
FIG. 4 is a perspective view of a portion of the assembled apparatus of FIG. 3, wherein side brackets are folded to a closed position atop the end bracket and divider bracket.

FIGS. 2 through 4 illustrate perspective views of a portion of the assembled apparatus 10 of FIG. 1, in various states of being collapsed from an open condition to a closed, collapsed condition. In FIG. 2, the divider bracket 24 is shown in an unlocked position wherein the legs 44 of the bracket 24 have been translated up and out of their respective posts 20 and are ready to be pivoted to a closed position. In other words, the leg 44 has been translated up to a distal position with respect to the post 20. In contrast, the leg 44 of one of the end brackets 24 is shown in its locked position, proximal with respect to its respective post 20. Accordingly, the leg 44 may be moved down and up, or in and out of its respective post 20 from a position distal the post to a position proximal the post and across any mesial positions therebetween.

Figure 9:
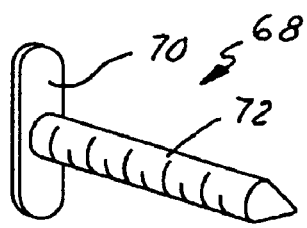
FIG. 9 is a perspective view of a T-pin of the apparatus of FIG. 1.
Figure 10:
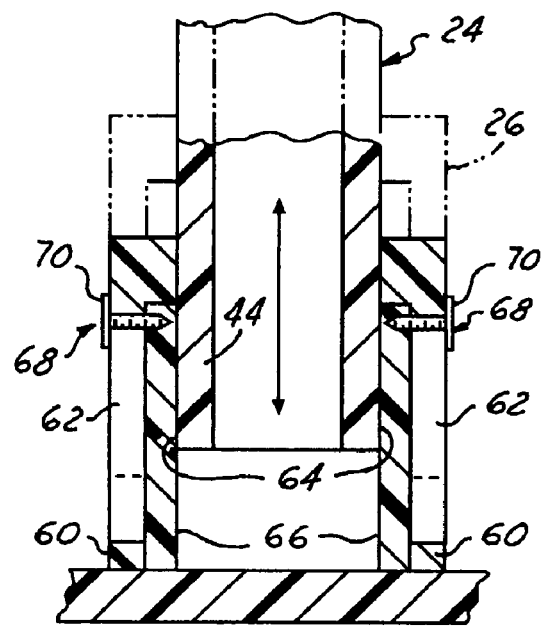
FIG. 10 is a cross-sectional view of a portion of the apparatus of FIG. 2, taken along line 10—10.

For example, FIG. 10 depicts a representative leg 44 of a retaining bracket 24 mounted within a respective post 20 such that the leg 44 is in a position that is vertically proximal with respect to the post 20. An outside perimeter 64 of the leg 44 fits loosely but closely within an inside perimeter 66 of the post 20. Accordingly, each leg 44 is rigidly supported in an upright manner within its respective post 20 so as to provide a stable and rigid overall structure of the apparatus 10. The mounting bracket 26 and, thus, the retaining bracket 24, are pivotably and translatably mounted to the post 20 by a T-shaped pin 68 that extends through the slot 62 of the mounting bracket 26 and an upper portion of the post 20. The T-shaped pin 68 is detailed in FIG. 9 and includes a flat head 70 and a threaded body portion 72 extending therefrom. Referring again to FIG. 10, the T-shape of the fastener 68 permits easy assembly and disassembly of the mounting bracket 26 from the post 20 wherein the flat head 70 is suitably sized and can be longitudinally oriented with respect to the slot 62 so that the flange portions 60 of the mounting bracket 26 can be flexed laterally outwardly wherein the flat head 70 may pass freely through the slot 62. The above description applies not only to the C-shape brackets 24 and respective posts 20, but also applies to the E-shaped brackets and respective posts (not shown).

Referring now to FIG. 3, the end and divider brackets 24 have been translated out of their respective posts 20 and subsequently pivoted toward one another to their closed and collapsed state. One of the brackets 24 includes the pivotably mounted latch 56 that latches to a pin 74 on the other of the brackets 24 to keep the brackets 24 from opening up, as better depicted in FIG. 6. Referring again to FIG. 3, once all of the C-shaped end and divider brackets 24 are fully collapsed, then the E-shaped side brackets 22 can be collapsed over top thereof. Accordingly, the inside posts 20 are provided with a shorter height than the outside posts 18 to permit the C-shaped end and divider brackets 24 to be folded to a flat first level. FIG. 4 illustrates the E-shaped side brackets 22 folded flat to a collapsed state over the end and center brackets 24, thereby defining a second level. Like the end and divider brackets 24, the side brackets 22 must first be translated up and out of their respective posts 18 and then pivoted closed. Finally, FIG. 5 illustrates the apparatus 10 in a fully collapsed state, wherein the latches 56 keep the brackets 22, 24 from opening up from their closed or collapsed state. Preferably, the overall thickness or height of the entire collapsed apparatus 10 is about two inches or less for compact storage and to permit the cargo compartment, or truck bed, to be used in the presence of the collapsed organizer apparatus 10.

Figure 13:
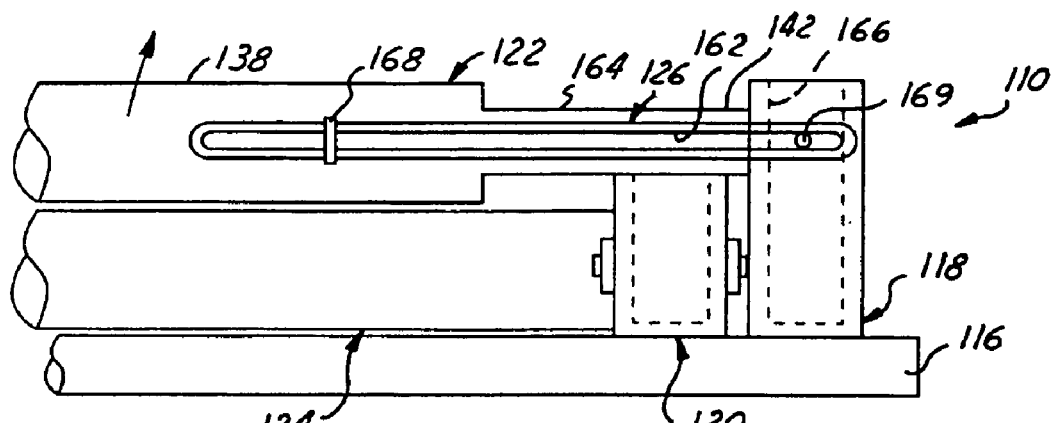
FIG. 13 is a fragmented end view of an apparatus according to an alternative embodiment of the present invention, wherein a side bracket is shown folded closed over top of an end bracket folded closed against a base.
Figure 14:
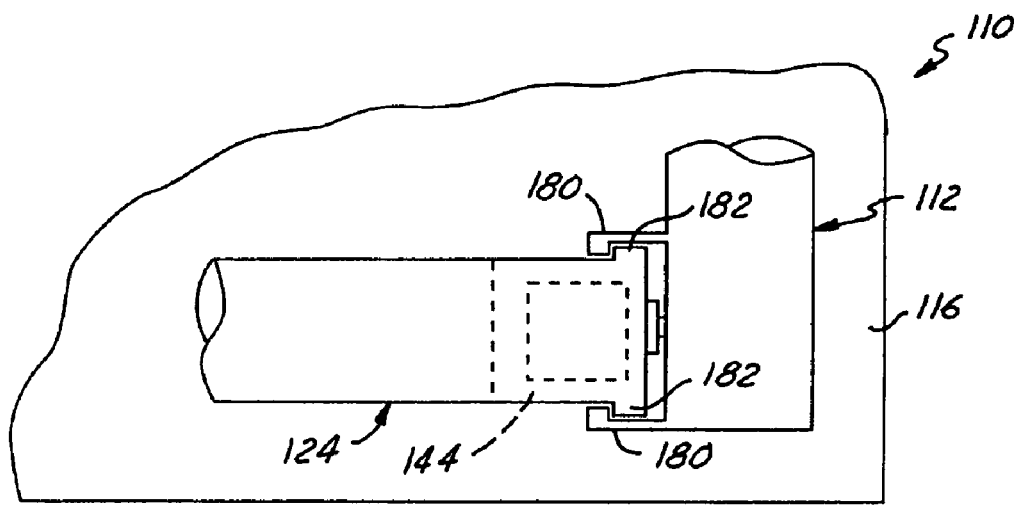
FIG. 14 is a fragmented top view of the apparatus of FIG. 13, wherein the end bracket is shown folded open and positioned upright and fully seated and the side bracket is shown folded open and interlocked to the end bracket.
Figure 15:
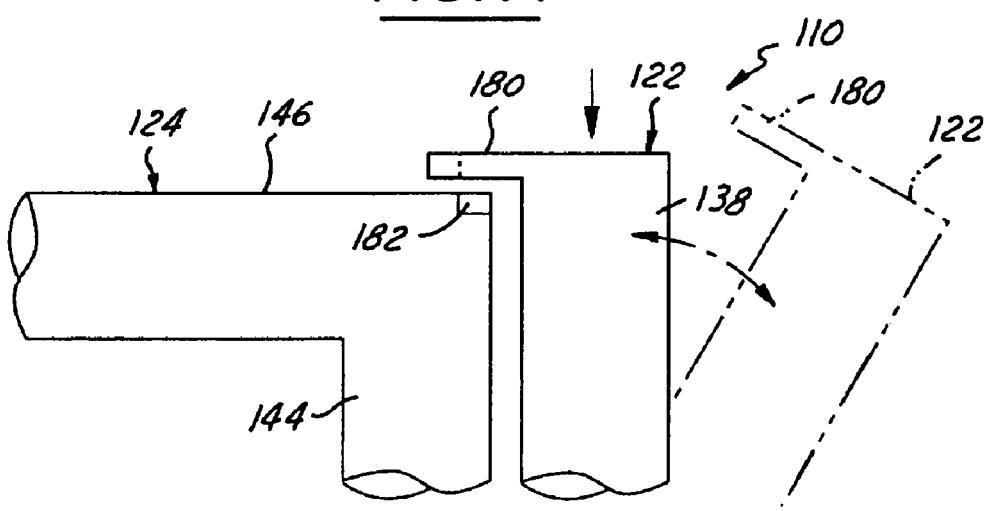
FIG. 15 is a fragmented end view of the apparatus of FIG. 14, wherein the end bracket is shown folded open and positioned upright and fully seated and the side bracket is shown folded open, fully upwardly extended, and being moved downwardly to interlock with the end bracket.

FIGS. 13 through 15 illustrate a cargo apparatus 110 according to an alternative embodiment of the present invention. Most of the components and features of this embodiment are similar to or the same as those components and features of the previously described embodiments. Accordingly, only portions of the apparatus 110 are depicted and only the significant differences over the previous embodiments will be discussed in detail here. Moreover, like numerals depict like components between the various embodiments. FIG. 13 illustrates a fragmented end view of the cargo apparatus 110 having a base plate 116 for supporting an outside post 118 and an inside post 120, wherein a side, E-shaped bracket 122 is shown folded closed over top of an end, C-shaped bracket 124 that is folded closed against the base 116. FIG. 14 is a fragmented top view of the apparatus 110 of FIG. 13, wherein the end bracket 124 is shown folded open and positioned upright and fully seated within its support posts (not shown), and the side bracket 122 is shown folded open and interlocked to the end bracket 124 by integral latches 180 of the side bracket 122 that engage integral lugs 182 of the end bracket 124. FIG. 15 is a fragmented end view of the apparatus 110 of FIG. 14, wherein the end bracket 124 is shown folded open and positioned upright and fully seated within its support posts (not shown), and the side bracket 122 is shown folded open to an obtuse angle depicted by hidden lines, and is also shown folded open to an upright upwardly extended position in solid lines, wherein the side bracket 122 is in a position to be moved in a downward direction to interlock the integral latches 180 with the integral lugs 182 of the end bracket 124.

Referring again to FIG. 13, a flat "slide guide" mounting bracket 126 is retained to one leg 138 of the side bracket 122 by a T-shaped pin 168 that is attached to the leg 138, and is retained to the outside post 118 by a fastener 169 such as a bolt or machine screw that is attached to outside post 118. Although only one side is shown, both sides of each leg 138 of each side bracket 122 include an individual T-shaped pin 168 and a corresponding individual slide guide mounting bracket 126. Each mounting bracket 126 includes a slot 162 that permits the side bracket 122 to be pivoted about the fastener 169 and translated with respect thereto, to the extent of the length of the slot 162. In other words, the T-shaped pin 168 and mounting bracket 126 are provided on opposite sides of each leg 138 and allow for sliding movement back-and-forth. When mounting each slide guide mounting bracket 126 to its respective leg 138, the bracket 126 is first oriented vertically such that the head of the T-shaped pin 168 passes freely through the slot 162 of the bracket 126. Then, the bracket 126 is pivoted clock-wise and a head of the fastener 169 is allowed to pass through the slot 162 of the bracket 126. This design allows for pivotable and translatable movement between the bracket 122 and the support post 118 and an easily attachable permanent connection to eliminate the possibility of lost parts. Accordingly, from its closed flat position as shown, the side bracket 122 can be pivoted in a clockwise direction, as depicted by the arcuate directional arrow, to a fully open position and at an obtuse angle with respect to the base 116—which is depicted in hidden line in FIG. 15. Still referring to FIG. 13, the end bracket 124 can also be pivoted from its closed flat position, as shown, to a fully upright position as shown in FIGS. 14 and 15.

Referring now to FIG. 15, once the end bracket 124 is pivoted to its fully upright position as shown here, then the mounting end (not shown) of each leg 144 can be inserted and seated within its respective support post (not shown)—as fully described in the previous embodiments. Thereafter, and still referring to FIG. 15, the side bracket 122 can be pivoted in a counter-clockwise direction—as depicted by the rotational directional arrow—from its fully open and obtuse position as shown in hidden lines, to a fully upwardly extended position as shown in solid lines, such that the integral latch 180 clears over top of a retaining bar 146 and integral lug 182 of the end bracket 124. Then, from this fully upright and extended position, the side bracket 122 can be linearly translated in a downward direction—as depicted by the downward pointing arrow—and toward its support post (not shown). Referring now to FIG. 13, a mounting end 142 of the side bracket 122 has an outer perimeter 164 of reduced size that fits within an inner perimeter 166 of the outside post 118. Finally, as shown in FIG. 14, after the side bracket 122 is dropped down into its support posts (not shown), the integral latches 180 interengage with the integral lugs 182 of the end bracket 124. Thus, the integral latches 180 and integral lugs 182 cooperate to provide stability at the top of the cargo apparatus 110, while the interfitting mounting ends and support posts (not shown) provide stability at the bottom.

To reiterate the assembly procedure, there are four basic steps. First, from their closed flat positions, the side brackets 22, 122 are lifted and pivoted to a fully open and slightly outward or obtuse orientation. Next, from their closed flat positions, the end and center brackets 24, 124 are lifted to a fully open and upright position and the lower mounting ends thereof are fitted and fully seated down within their respective support posts 20, 120. Then, the side brackets 22, 122 are pivoted back slightly to a fully upright and linearly extended position. Finally, the side brackets 22, 122 are lowered such that lower mounting ends thereof are fitted and fully seated down within their respective support posts 18, 118, and in the embodiment of FIGS. 13–15, such that the integral latches 180 interengage over the integral lugs 182 of the center and end brackets.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting and that various changes may be made without departing from the spirit or the scope of the invention.

I claim:

1. A cargo apparatus comprising:
   a base having at least one end and at least one side, the at least one end having at least one laterally inside post extending therefrom, the at least one side having at least one laterally outside post extending therefrom, wherein the at least one laterally outside post is positioned laterally outside with respect to the at least one laterally inside post;
   at least one end retaining bracket pivotably and translatably mounted to the at least one laterally inside post between open and closed positions; and
   at least one side retaining bracket pivotably and translatably mounted to the at least one laterally outside post between open and closed positions.

2. The cargo apparatus of claim 1 wherein at least the base may be integrated with a bedliner of a vehicle.

3. The cargo apparatus of claim 1 wherein the base includes hook and loop fastener material thereunder for fastening the apparatus to another object.

4. The cargo apparatus of claim 1 wherein each post has an internal periphery into which fits a respective outer periphery of the respective retaining bracket.

5. The cargo apparatus of claim 4 wherein each post is composed of square tube stock.

6. The cargo apparatus of claim 1 wherein each post includes rounded portions thereon to facilitate pivoting of each respective retaining bracket with respect thereto.

7. The cargo apparatus of claim 1 further comprising a mounting bracket interposed between each retaining bracket and the respective post.

8. The cargo apparatus of claim 7 further comprising T-shaped fasteners extending through slots in each mounting bracket and into each post.

9. The cargo apparatus of claim 1 further comprising a latch attached to each retaining bracket to lock each retaining bracket in a closed, collapsed state.

10. The cargo apparatus of claim 1 further comprising at least one latch extending from a portion of the at least one side retaining bracket, said at least one latch interengaging with at least one lug of a corresponding one of the at least one end retaining bracket to provide stability to the cargo apparatus in an open position.

11. The cargo apparatus of claim 1 further comprising a panel attached to each retaining bracket.

12. A cargo apparatus comprising:
    a base;
    a first plurality of structural members pivotably and translatably mounted to the base, said first plurality of structural members being adapted to fold to a first level closed position; and
    a second plurality of structural members pivotably and translatably mounted to the base laterally outside of said first plurality of structural members, said second plurality of structural members being adapted to fold to a second level closed position over top of said first plurality of structural members.

13. The cargo apparatus of claim 12 wherein at least the base may be integrated with a bedliner of a vehicle.

14. The cargo apparatus of claim 12 wherein the base includes hook and loop fastener material thereunder for fastening the apparatus to another object.

15. The cargo apparatus of claim 4 wherein the structural members are composed of square tube stock.

16. The cargo apparatus of claim 12 further comprising latches attached to one or more of the structural members to lock the structural members in a closed, collapsed state.

17. The cargo apparatus of claim 12 further comprising at least one latch extending from a portion of the first plurality of structural members, said at least one latch interengaging with at least one lug of a corresponding one of the second plurality of structural members to provide stability to the cargo apparatus in an open position.

18. The cargo apparatus of claim 12 further comprising panels attached to the pluralities of structural members.

19. A cargo apparatus comprising:
a base having at least one end and at least one side, with the at least one end having at least one laterally inside post extending therefrom, and with the at least one side having at least one laterally outside post extending therefrom;
at least one end bracket and at least one side bracket are pivotably and translatably mounted to the base, wherein the brackets each have at least one support leg with a mounting end, wherein the mounting end pivotably mounts to its respective post on the base between open and closed positions and also translatably mounts to its respective post between an unlocked position distal the post and a locked position proximal the post, whereby the apparatus is collapsible to a closed portable position, and is foldable to an open position.

20. The cargo apparatus of claim 19 wherein at least the base may be integrated with a bedliner of a vehicle.

* * * * *